US009440268B2

(12) United States Patent
Kozak et al.

(10) Patent No.: US 9,440,268 B2
(45) Date of Patent: Sep. 13, 2016

(54) APPARATUS FOR LAYING AND ANCHORING A SHEET OF MATERIAL ON A GROUND SURFACE

(71) Applicant: EPI Environmental Products Inc., Vancouver (CA)

(72) Inventors: Randall J. Kozak, Surrey (CA); Justin T. J. Bond, Mission (CA); Paul A. Rempel, Port Coquitlam (CA); Stephen P. Deakin, Port Coquitlam (CA); Lynn M. Jensen, Port Coquitlam (CA); Kathleen M. Gregoire, Port Coquitlam (CA); Ryan H. Murchie, Surrey (CA)

(73) Assignee: EPI ENVIRONMENTAL PRODUCTS INC., Vancouver, British Columbia (CA)

( * ) Notice: Subject to any disclaimer, the term of this patent is extended or adjusted under 35 U.S.C. 154(b) by 27 days.

(21) Appl. No.: 14/287,167

(22) Filed: May 26, 2014

(65) Prior Publication Data

US 2015/0336142 A1    Nov. 26, 2015

(51) Int. Cl.
*B09B 1/00*    (2006.01)
*A01G 13/00*   (2006.01)
*B26D 7/01*    (2006.01)
*B26D 7/02*    (2006.01)

(52) U.S. Cl.
CPC .............. *B09B 1/004* (2013.01); *B09B 1/00* (2013.01); *B26D 7/01* (2013.01); *B26D 7/015* (2013.01); *B26D 7/02* (2013.01); *B26D 7/025* (2013.01); *A01G 13/0287* (2013.01); *Y10T 83/04* (2015.04); *Y10T 83/7487* (2015.04)

(58) Field of Classification Search
CPC ... B09B 1/004; B26D 7/015; A01G 13/0287
See application file for complete search history.

(56) References Cited

U.S. PATENT DOCUMENTS

| 5,536,116 | A  | * | 7/1996 | Lammers | ................ | B09B 1/004 |
| | | | | | | 405/129.9 |
| 5,620,281 | A  | * | 4/1997 | Lammers | ................ | B09B 1/004 |
| | | | | | | 405/129.75 |
| 6,558,079 | B1 | * | 5/2003 | Kozak | ..................... | B09B 1/004 |
| | | | | | | 405/129.15 |
| 2013/0045054 | A1 | * | 2/2013 | Kozak | ..................... | B09B 1/004 |
| | | | | | | 405/129.45 |

FOREIGN PATENT DOCUMENTS

WO    2012/061918    5/2012

OTHER PUBLICATIONS

Photos (3) of an Enviro Cover machine dated Feb. 2011 taken in City of Industry, California.

* cited by examiner

*Primary Examiner* — Tara M. Pinnock
(74) *Attorney, Agent, or Firm* — Nyemaster Goode P.C.

(57) ABSTRACT

A machine (20) for laying a film (122) on a ground surface such as a landfill has a pair of opposed, support arms (84) each having a respective film roll support mechanism (94). In some embodiments the support arms are pivotable. Each film roll support mechanism (94) has a moveable arm (102) with a film roll support bracket (106), and a hydraulic system (98, 104) controllable by an operator of the machine for retracting and extending the moveable arm (102). The machine has means (120, 124) for holding the roll (96) of film between the brackets (106) for unwinding the film onto the ground. The machine may include a film cutter assembly (154) for cutting the laid film.

20 Claims, 7 Drawing Sheets

APPARATUS FOR LAYING AND ANCHORING A SHEET OF MATERIAL ON A GROUND SURFACE

TECHNICAL FIELD OF THE INVENTION

The invention pertains to the laying of sheets of material, for example films, membranes, textiles and sheathing materials, on ground surfaces such as landfills to form a barrier between the ground surface and the environment.

BACKGROUND OF THE INVENTION

The covering of landfills is a practice required by regulation in many jurisdictions. For example, it is often required that the daily fill of garbage be covered at the end of the day, or that the landfill be covered when it is not in operation. It is known in the art to lay strips of film, such as degradable polyethylene, in a side-by-side or overlapping arrangement to cover the landfill, and to place an anchoring material (sometimes called ballast) such as dirt on the film to hold it in place. The ground area that requires regular covering in a landfill may be very large, and machines have been developed to apply strips of film to cover such areas.

WO 2012/061918 (Kozak) discloses a tracked, self-propelled machine for laying a film and depositing an anchoring material on it to cover a landfill. A roll of film is suspended by cables from support arms at the back of the machine for unwinding onto the ground surface as the machine moves forward, and anchoring material is released from the back of a box on the machine and is deposited on the laid film. However, since the film roll is suspended by cables, it swings freely when the machine moves over uneven ground, making it difficult to lay the film in a controlled, regular way. Nor can the operator conveniently adjust the height of the film roll during deployment in response to windy conditions or obstacles such as rocks on the ground surface, nor adjust the angle of the roll relative to the ground surface in response to sloping ground.

There remains a need for effective apparatus for applying strips of film to large areas of ground surfaces.

SUMMARY OF THE INVENTION

According to one aspect, the invention provides a machine for laying a film on a ground surface and depositing an anchoring material on the film. The machine has a container for holding the anchoring material, means for releasing the anchoring material from the container, means for moving the machine over the ground surface, and a pair of support arms each having a respective film roll support mechanism operatively connected to it. In some embodiments, the support arms are movable between an operating position in which the respective film roll support mechanism is extended outward from the machine at a respective opposed side thereof, and a retracted position in which the respective film roll support mechanism is adjacent to the respective opposed side of the machine. The two film roll support mechanisms each comprise a movable arm, a film roll support bracket operatively connected to the movable arm, and a hydraulic system controllable by an operator of the machine for retracting and extending the movable arm to fix the film roll support bracket in a selected position above the ground surface. The machine has means for holding the roll of film between the two roll support brackets for unwinding of the film onto the ground surface as the machine is moved and the anchoring material is deposited onto the film.

According to another aspect, the invention provides a machine for laying a film on a ground surface and depositing an anchoring material on the film. The machine has a container for holding and releasing the anchoring material, a pair of support arms each having a respective film roll support mechanism operatively connected thereto. In some embodiments, the support arms are movable between an operating position in which the respective film roll support mechanism is extended outward from the machine at a respective opposed side thereof, and a retracted position in which the respective film roll support mechanism is adjacent to the respective opposed side of the machine. The two film roll support mechanisms each comprise a movable arm and a film roll support bracket operatively connected to the movable arm, the movable arm being retractable and extendable by a hydraulic system controllable by an operator of the machine to fix the film roll support bracket in a selected position above the ground surface. The machine has a film roll holder for holding the roll of film between the two roll support brackets for unwinding of the film onto the ground surface as the machine is moved over the ground surface and the anchoring material is deposited onto the film.

According to another aspect, the invention provides a machine for laying a film on a ground surface and depositing an anchoring material on the film. The machine has a container for holding the anchoring material, means for releasing the anchoring material from the container, means for moving the machine over the ground surface, and a pair of support arms each having a respective film roll support mechanism operatively connected to it. Each of the two film roll support mechanisms comprises a movable arm, a film roll support bracket operatively connected to the movable arm, and a hydraulic system controllable by an operator of the machine for retracting and extending the movable arm to fix the film roll support bracket in a selected position above the ground surface. The machine has means for holding the roll of film between the two roll support brackets for unwinding of the film onto the ground surface as the machine is moved and the anchoring material is deposited onto the film.

According to another aspect, the invention provides a machine for laying a film on a ground surface and depositing an anchoring material on the film. The machine comprises a container for holding and releasing the anchoring material, a pair of support arms each having a respective film roll support mechanism operatively connected to it. The two film roll support mechanisms each comprise a movable arm and a film roll support bracket operatively connected to the movable arm. The movable arm is retractable and extendable by a hydraulic system controllable by an operator of the machine to fix the film roll support bracket in a selected position above the ground surface. The machine has a film roll holder for holding the roll of film between the two roll support brackets for unwinding of the film onto the ground surface as the machine is moved over the ground surface and the anchoring material is deposited onto the film.

According to another aspect, the invention provides a film cutter assembly for use with a machine for laying film on a ground surface. The assembly comprises: a first film-clamping surface; means for engaging the film unwound from a roll of film carried by the machine and for bringing the film into engagement with the first film-clamping surface; a film-clamping member having a second film-clamping surface, the film-clamping member being moveable between a first position in which the second film-clamping surface is spaced from the first film-clamping surface and a second position in which the second film-clamping surface engages the first film-clamping surface; means for moving the film-clamping member between its first and second positions; and means for cutting the film when it is held between the first film-clamping surface and the second film-clamping surface.

According to another aspect, the invention provides a film cutter assembly for use with a machine for laying film on a ground surface. The film cutter assembly has a film pick-up assembly for engaging and lifting the film, a fixed cutter assembly comprising a first film-clamping surface, and a film-clamping member having a second film-clamping surface, the film-clamping member being moveable between a first position in which the second film-clamping surface is spaced from the first film-clamping surface, and a second position in which the second film-clamping surface is pressed against the first film-clamping surface. The film pick-up assembly comprises a film pick-up member moveable between a first position in which the film pick-up member is out of engagement with the film and a second position in which the film pick-up member engages and holds the film adjacent to the first film-clamping surface. The film cutter assembly also has a mechanism for moving the film-clamping member between its first and second positions, a mechanism for moving the film pick-up member between its first and second positions, and a mechanism for cutting the film when held between the first film-clamping surface and the second film-clamping surface.

According to another aspect, the invention provides a method of cutting a film dispensed by a machine for laying a film on a ground surface and for depositing an anchoring material on the film. A film pick-up member is moved to engage the film unwound from a roll of film and to bring the film into engagement with a first film-clamping surface. A second film-clamping surface is moved to press against the first film-clamping surface, with the film gripped between the first film-clamping surface and the second film-clamping surface. A cutting blade is moved across the film and cuts the film adjacent to the first film-clamping surface and the second film-clamping surface to release a length of cut film. The film pick-up member is moved out of engagement with the film while a free end of the unwound film is held between the first and second film-clamping surfaces, such that a length of unwound film extends between the roll of film and the first and second film-clamping surfaces, the length of unwound film being in position to receive the anchoring material from the machine.

Further aspects of the invention and features of specific embodiments of the invention are described below.

DETAILED DESCRIPTION

In the following description and the drawings, corresponding and like elements are indicated by like reference characters.

An embodiment of the film-deploying machine and of the invention is described below in respect of applying a film to a landfill. This is only one example of a practical application of the invention. The invention is suitable for use in other applications where there is a need to create a barrier at the ground surface, for example to reduce run-off or environmental contamination, or to contain gases under or above the ground surface. Such applications include those in the farming, mining and road construction industries. In this specification, the terms "film" and "sheet of material" are used synonymously and refer to any form of sheet material suitable for such applications.

Figure 1:
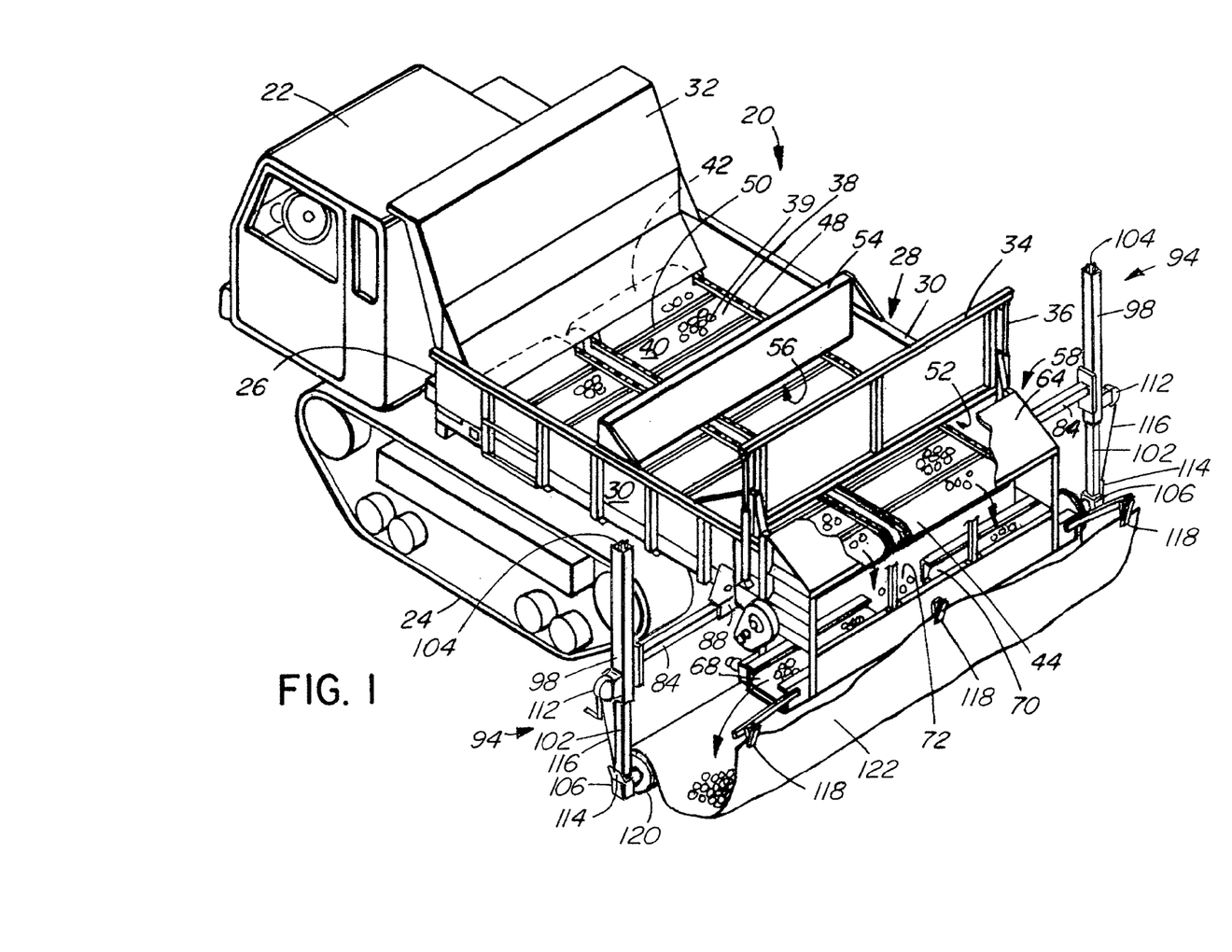
FIG. 1 is a side perspective view of a machine according to one embodiment of the invention.
Figure 2:
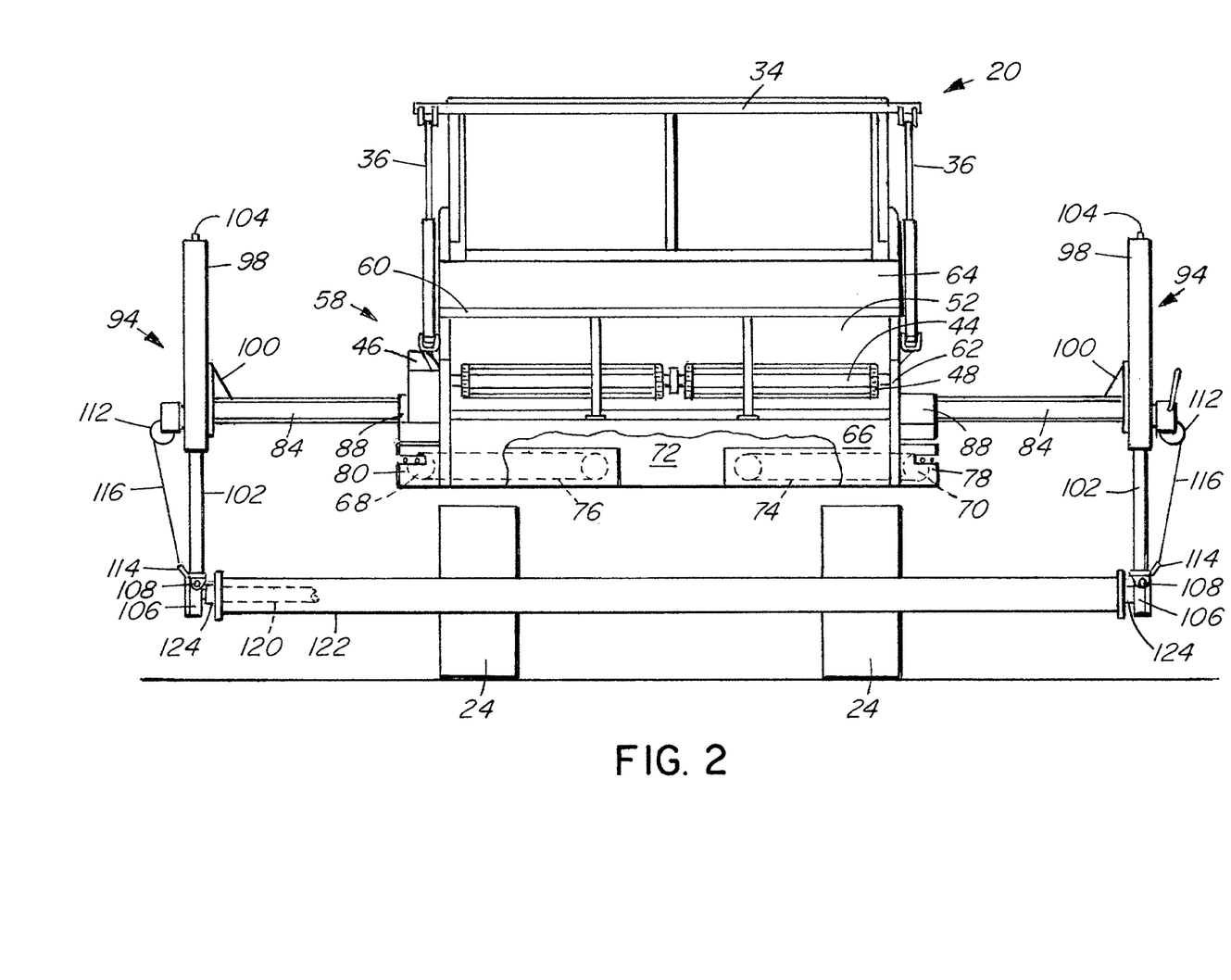
FIG. 2 is a partially cut-away back elevation view thereof.
Figure 3:
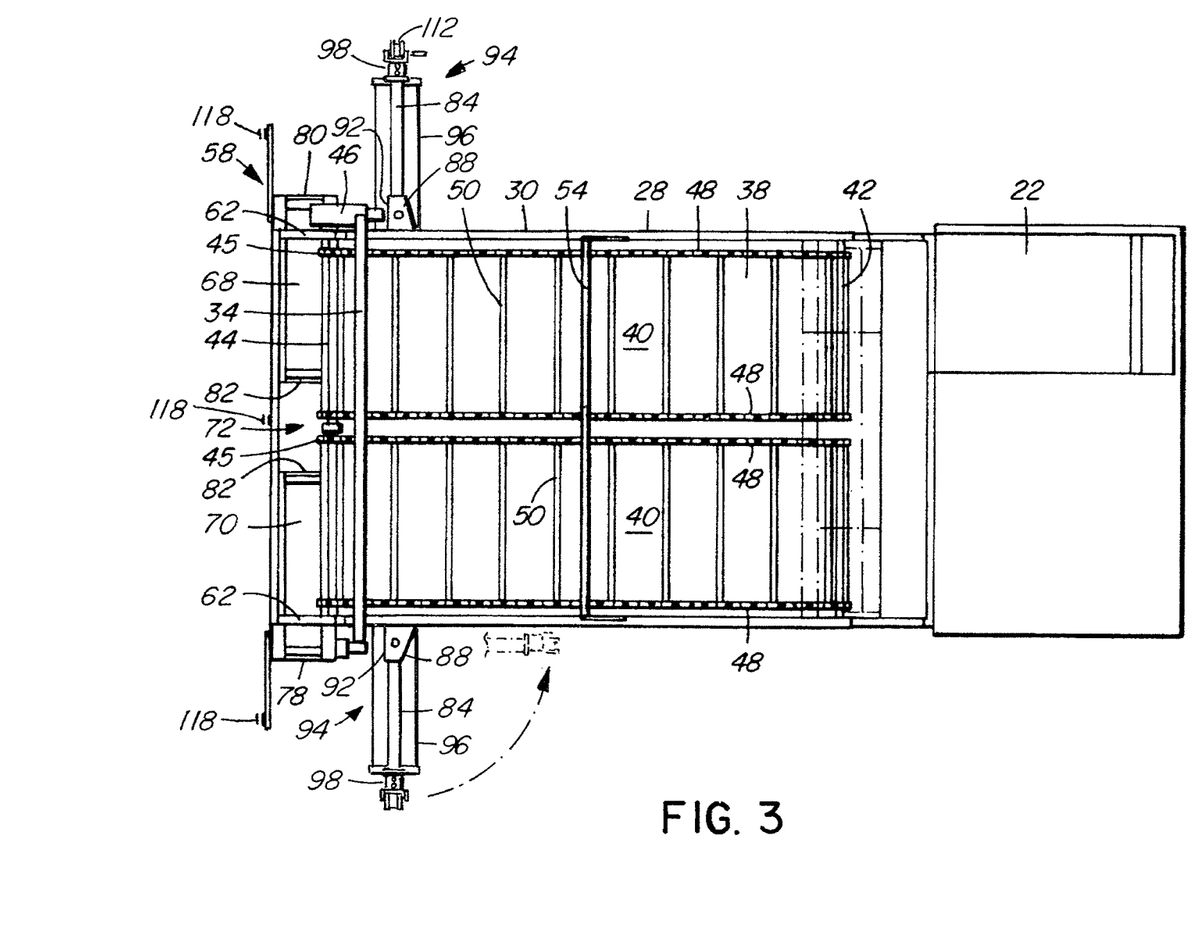
FIG. 3 is a partially cut-away top plan view thereof.

Referring to FIGS. 1 to 3, the film-deploying machine 20 is a motorized, self-propelled tracked vehicle having an operator's cab 22 at the forward end of the vehicle, a track 24 and a frame 26 supporting a box or container 28. The track may have rubber track plates.

The box 28 has side walls 30, a front wall 32 behind the cab and an end gate 34 at the back end. The end gate 34 is vertically movable by means of hydraulic cylinders.

The box 28 has a hydraulic chain floor 38, best seen in FIGS. 1 and 3, for moving anchoring material towards the back end of the box for removal, as described below. The box is sufficiently large that it can carry a large volume of anchoring material to the area of deployment, thus increasing the efficiency of the deployment operation. The anchoring material 39 may comprise dirt, clay, gravel, sand, crushed stone, sludge, recycled waste such as pieces of asphalt, or other materials suitable for a particular application.

The chain floor 38 comprises a floor panel 40, a front roller 42 at the front end of the floor, i.e. the end adjacent to the cab, and a rear roller 44 at the back end of the floor, the rear roller shaft being driven by a hydraulic motor 46. Two spaced-apart pairs of chains 48 engage sprockets 45 on the floor roller shafts 42, 44 and extend around the floor roller shafts and the floor panel 40, forming continuous loops running above and below the floor panel 40. Each pair of chains is connected by a plurality of spaced-apart bars 50 extending transverse to the longitudinal axis of the machine. The bars 50 are rectangular in cross section and may be about 1.5 inches (3.8 cm) in height, being adapted to engage and move anchoring material. Bars of greater or lesser heights can be employed, depending on the intended volume of anchoring material to be moved at a given speed of rotation of the chain floor. As the rear roller shaft 44 is rotated, the chains and accordingly the bars 50 are moved rearward along the top surface of the floor panel, moving anchoring material in the box toward the end gate 34.

When the end gate 34 is raised, there is an opening 52 between the floor panel 40 and the lower edge of the end gate, through which the anchoring material can pass. The height of the opening 52 is controllable by the operator by actuation of the hydraulic cylinders 36, to regulate the flow of anchoring material out of the box. Optionally, a flexible rubber strip (not shown in the drawings) may be attached to the end gate along its lower edge, partly covering the opening 52, to reduce leakage of small pieces of the anchoring material when the vehicle is being moved after laying one strip of film into position to lay a further strip.

The box 28 also has a center gate 54 about half-way between the front wall 32 and the end gate 34, extending between the side walls 30. There is a space 56 between the floor panel 40 and the lower edge of the center gate. The vertical position of the center gate is adjustable to adjust the height of the space 56, either manually or hydraulically by the operator. The center gate is used to regulate the movement of anchoring material within the box as the chain floor is operated.

An anchoring material distribution module 58, best seen in FIGS. 2 and 3, is disposed at the back end of the box 28. It comprises a frame 60 with two side panels 62, a top panel 64 and a rear panel 66. Two conveyors 68, 70 are disposed in the frame 60, separated by a gap 72 and oriented transverse to the longitudinal axis of the machine. The conveyors 68, 70 comprise conveyor belts 74, 76 and associated rollers and hydraulic motors. The belts 74, 76 are positioned below the rear roller 44 of the chain floor, so that anchoring material that falls off the back end of the chain floor falls onto the belts 74, 76 and into the gap 72 that separates them. In use, the belts 74, 76 are driven a direction so as to convey the anchoring material towards to the outer ends 78, 80 respectively, of the conveyors.

Two pivoting arms 84 are disposed on the frame 26 near the back end of the box 28 on the left and right sides respectively of the machine. Each arm 84 is pivotally connected to the frame by a respective bracket 88. The brackets are open at their forward side to permit the arms to pivot forward into a position adjacent to the respective sides of the machine. The brackets are closed by a bracket wall 92 at their rearward side to limit the rearward pivotal movement of the arms and define an operating position for the arms, in which they extend outwardly from the sides of machine at a right angle thereto. Film roll support mechanisms are connected to the respective pivoting arms.

Figure 4:
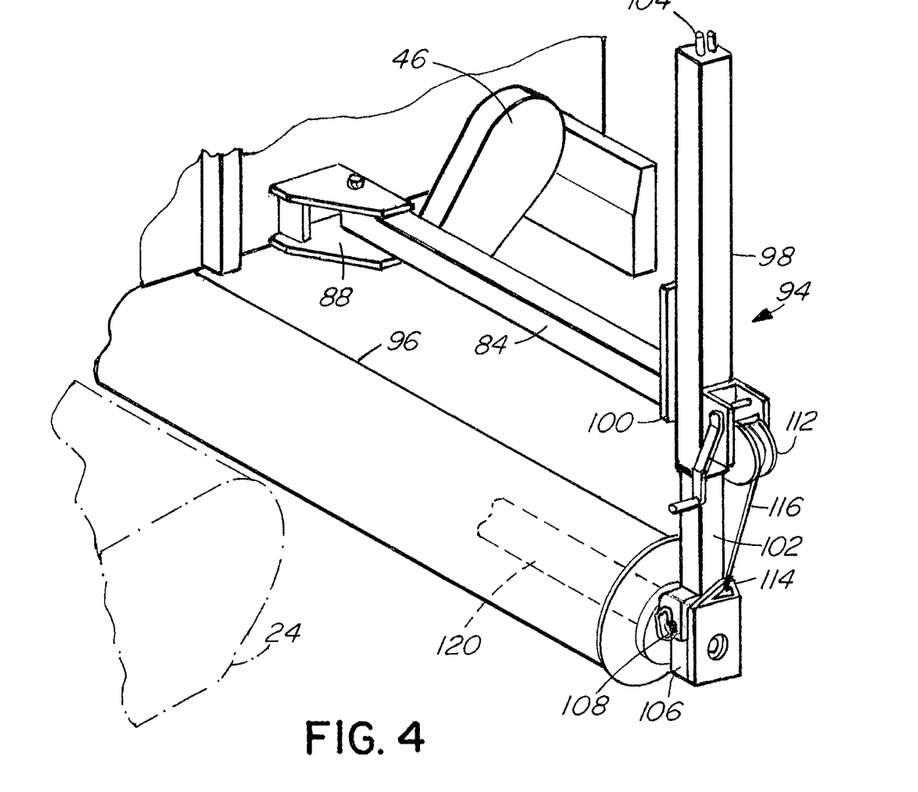
FIG. 4 is a detailed view of a pivot arm and film roll support mechanism.

Referring to FIG. 4, each pivoting arm 84 is connected to a film roll support mechanism 94, having a hydraulically-operated means for holding, raising and lowering a film roll 96. An outer hydraulic cylinder member 98 is attached to the distal end of the arm 84 by a mounting bracket 100. An inner cylinder member functioning as a vertically-movable arm 102 is moveable within the outer cylinder 98, between a retracted position, in which the movable arm 102 is substantially inside the outer cylinder member 98 and an extended position, in which the moveable arm 102 extends downwardly from the outer cylinder member 98. Hydraulic fittings 104 are provided on the top of the outer cylinder member 98 for the inflow and outflow of hydraulic fluid through conduits (not shown) connected to a hydraulic control system under the control of an operator in the cab.

A film roll support bracket 106 is removably attached to the movable arm 102 at its lower end by means of a bracket pin 108. The support bracket 106 has bearings 110 for the rotational support of a film roll end cap (top hat) 124, as further described below.

The film roll support mechanism 94 includes means for raising the film roll 96 from the ground to attach it to the film roll support bracket 106, and to lower an emptied roll back to the ground. A manually-operated winch 112 is affixed to the outer cylinder 98 and a winch bracket 114 extends from the film roll support bracket 106. A cable 116 from the winch 112 is attached by a hook to the winch bracket. When the bracket pin 108 is removed, the film roll support bracket 106 is disengaged from the moveable arm 102, permitting it to be lowered or raised by operation of the winch 112.

The film roll support mechanism 94 on the right side of the machine, attached to the right side pivot arm 84, is the mirror image of the film roll support mechanism 94 shown in FIG. 4.

Figure 5:
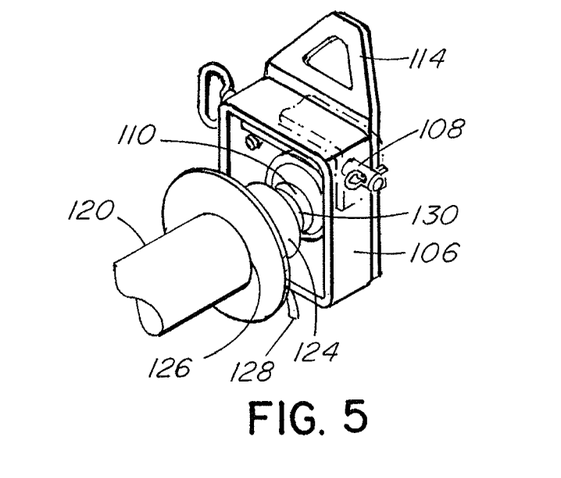
FIG. 5 is a detailed view of a film roll support bracket and top hat.

The film roll 96 has an inner cylindrical spool or core on which the film 122 is wound. The core is fitted loosely over a mandrel tube 120. A length of the mandrel tube 120 at either end extends past the edge of the wound film for engagement in a respective top hat 124. As seen in FIG. 5, the top hat has a tubular portion 126 that receives the end of the mandrel tube 120 and is locked to it by means of a top hat tube pin 128. The top hat also has a bearing shaft 130 that engages with the top hat bearings 110 of the film roll support brackets 106. Accordingly, the film roll 96 is rotatably held by the film roll support brackets 106 for unwinding of the film from the roll.

Three clips 118 are arranged at the back of the distribution module 58 for attaching the end of a strip of film 122 when commencing deployment, and after a strip is laid and cut, as further described below.

The cab 22 includes operator controls for actuating and controlling the speed of the chain floor 38 and the conveyors 68, 70, for raising and lowering the end gate 34, for controlling the direction and speed of the vehicle, and for hydraulically raising and lowering the film roll by the film roll support mechanism 94. The height of each end of the film roll can be controlled independently by the operator, permitting the film roll to be positioned at an angle relative to the vehicle on the ground.

Strips of film 122 are deployed using the machine 20 in the following manner. Anchoring material 39 is loaded into the box 28. The mandrel tube 120 is inserted into the core of the film roll 96 on the ground underneath the rear of the machine, and a top hat 124 is affixed to each end of the mandrel tube. The film roll width may be, for example, 18 feet (5.5 meters). The film roll support brackets 106 are affixed to the top hats 124. The film roll is manually winched upward using the winches 112 and winch cables 116, and the film roll support brackets are affixed to the movable arms 102. The cables 116 are detached from the film roll support brackets 106 and their free end may be hooked onto the outer cylinders 98 or otherwise out of contact with the film roll and moveable arms 102. The free end of the strip of film is attached to the three clips 118, forming a loose length of film below the anchoring material distribution module 58, as shown in FIG. 1. The two outer clips 118 are attached to respective longitudinal edges of the strip and the middle clip is attached to the middle of the strip. The length of film hanging between the three clips and the film roll forms a pocket to catch the anchoring material that initially falls onto it. The end gate 34 is raised to form the opening 52 and the chain floor 38 and conveyors 68, 70 are actuated. As anchoring material falls through the gap 72 and off the outer ends 78, 80 of the conveyors, it falls onto the hanging length of film. The weight of the anchoring material pulls the film to the ground surface, holding it there. The vehicle 20 is then driven forward, releasing the free end of the film from the clips. As the vehicle advances forward, film is unwound from the roll, laying a strip of film on the ground behind the machine, and three lines of anchoring material are deposited on the strip, one along the center line from anchoring material falling through the gap 72, and one line near each longitudinal edge of the strip from the material falling off the outer ends 78, 80 of the conveyors.

Depending on the width of film being used, chutes may optionally be provided at the outer ends 78, 80 of the conveyors 68, 70 to direct the two outer streams of anchoring material to a position adjacent to the edges of the film strip. For example, outwardly-extending chutes may be used if the width of the film is substantially greater than the distance between the outer ends 78, 80 of the conveyors. Alternatively, the speed of the conveyor belts may be increased or decreased to control the position of the streams of anchoring material thrown from the ends 78, 80 of the conveyors.

When the machine 20 has laid a strip of film to the end of the landfill working face or other selected position, the machine is stopped and the strip is cut, either manually or by automated cutting means. The free end of the strip of film on the roll is attached to the clips 118, so the film is in position to receive anchoring material. The machine is then moved into position to lay a second strip parallel to the first strip and adjacent to or overlapping it. The operation is repeated until the desired ground area has been covered. The strips would be applied in overlapping manner for applications that require a continuous, impermeable barrier at the ground surface.

During the laying of the strips of film the film roll may be raised or lowered by the operator by operation of the movable arms 102, to be farther from or closer to the ground, depending upon conditions at the landfill. For example windy conditions may require the roll to be positioned closer to the ground to reduce the exposure of the film to the wind before it is anchored; rough ground or obstacles may require the roll to be set higher to avoid damage to the film; uneven or sloping round may require the roll to be oriented at an angle to lay the film properly.

When the film roll is empty and requires replacement, the winch cables 116 are hooked onto the winch brackets 114 and the winches are manually turned to take the weight of the film roll 96 off the moveable arms 102. The film roll support brackets 106 are then released from the moveable arms 102 and the empty roll is winched down to the ground. The film roll support brackets 106 and top hats 124 are removed and the empty roll is then removed from the mandrel tube 120. A new film roll may then be inserted.

When the machine 20 is to be moved without transporting a roll of film, the pivot arms 84 are pivoted forward into a position in which the arms and the film roll support mechanisms 94 are folded and held against the sides of the machine. This decreases the effective width of the machine to facilitate movement on roads, through gates, into storage buildings, etc.

Figure 6A:
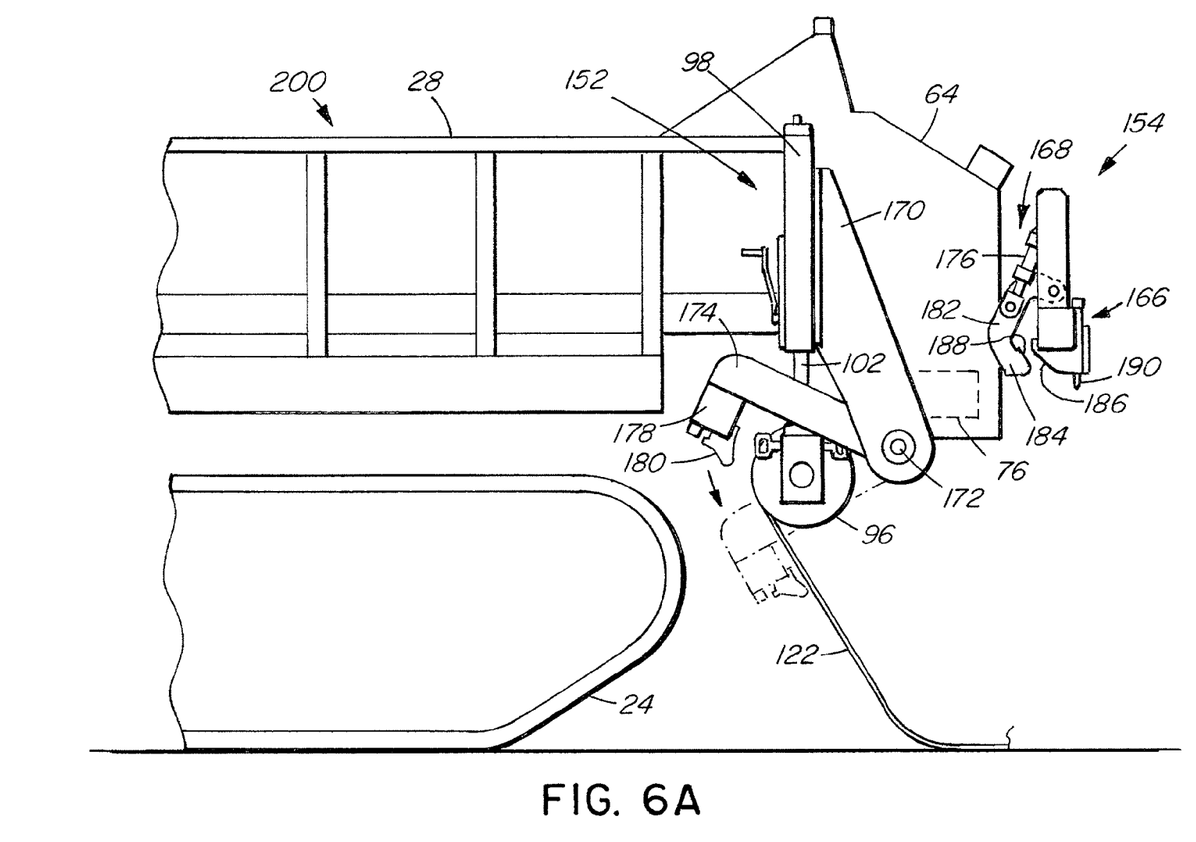
FIG. 6A is a side elevation view of an embodiment of the film cutter assembly mounted on a film-deploying machine in the film-dispensing position.
Figure 6B:
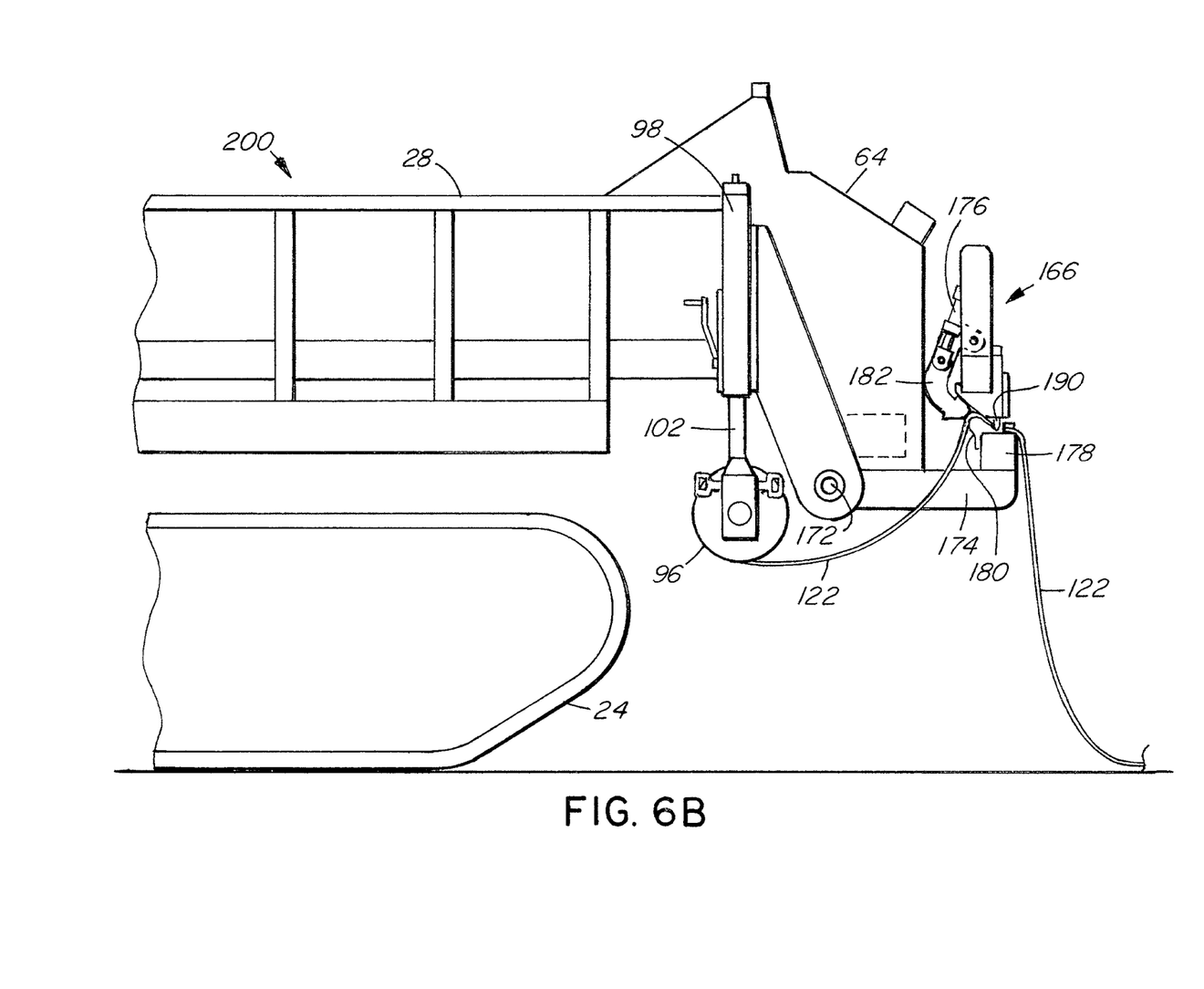
FIG. 6B is a side elevation view of the film cutter assembly in the film-cutting position.
Figure 6C:
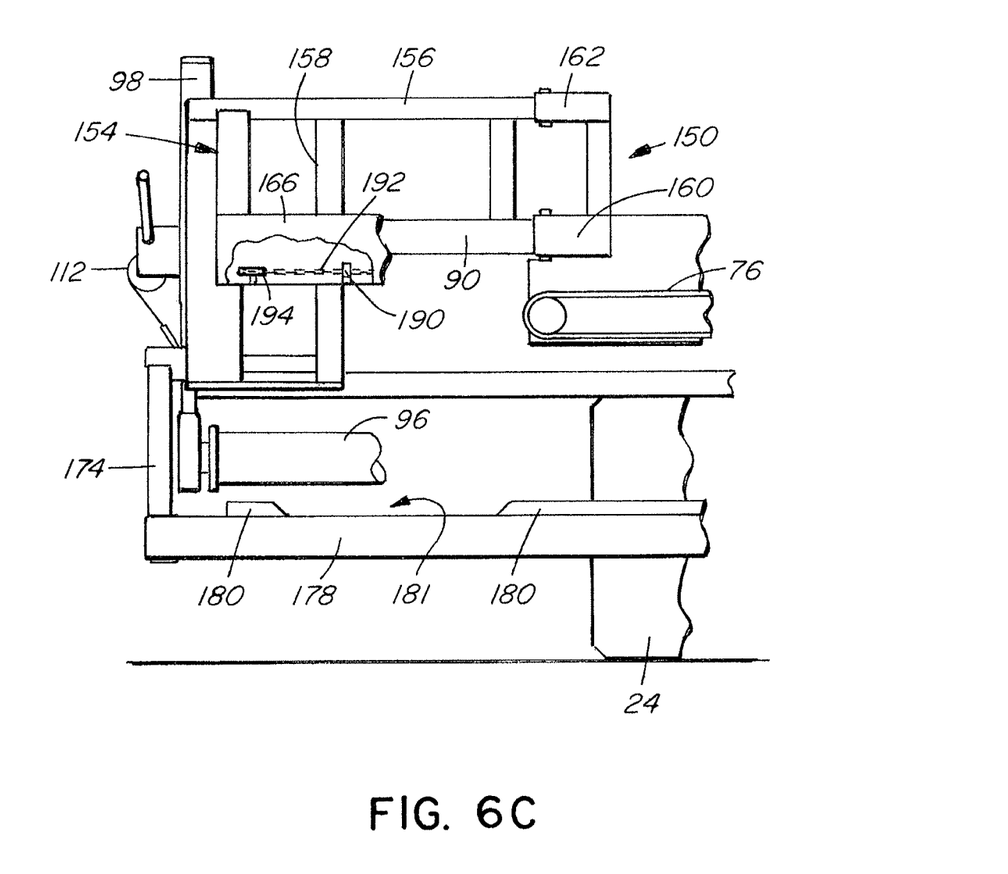
FIG. 6C is a partial back elevation view of the film cutter assembly.

In another embodiment of the invention, shown in FIGS. 6A to 6C, a film cutter assembly is provided for a film-deploying machine 200. The film cutter assembly 154 comprises, as principal parts, a film pick-up assembly 152, a fixed cutter assembly 166 and a film-clamping assembly 168. In general terms, the pick-up assembly 152 lifts the film up to the fixed cutter assembly and the film-clamping assembly holds the film there for cutting by the fixed cutter assembly.

In this embodiment the two support arms 90 are respectively part of left and right side outrigger assemblies 150, in order to support the weight of the pick-up assembly 152 of the film cutter assembly 154. Each outrigger assembly is mounted to the frame 26 of the machine 200 and has a second support arm 156, parallel to the support arm 90 and connected to it by bracing members 158. Both support arms 90, 156 are connected to a side of the machine 200 by brackets 160, 162 respectively.

The pick-up assembly 152 is mounted on the outrigger assemblies 150. A support member 170 affixed to each outrigger assembly has a pivot joint 172 at its distal end and a pick-up arm 174 is pivotable about the joint 172. Each pick-up arm 174 is affixed to a respective end of a transverse pick-up member 178, which extends across the full width of the film cutter assembly 154. The pick-up member 178 is thus moveable, by the pivoting of the two pick-up arms 174, between a forward position and a rearward position. In the course of such movement to the rearward position, the pick-up member 178 engages and lifts the film, as described below.

The fixed cutter assembly 166 is affixed to the machine 200 rearward of the anchoring material distribution module 58. It is operatively attached to a film-clamping assembly 168 having clamping arms 182 affixed to respective ends of a transverse clamping member 184, which extends across the full width of the film cutter assembly 154. The clamping arms 182 are pivotable, by the action of hydraulic cylinders 176, such that the clamping member 184 is moveable between an open position, in which the clamping member 184 is spaced from a clamping surface 186 of the fixed cutter assembly, to a closed position, in which a clamping surface 188 of the clamping member 184 is pressed against the clamping surface 186 of the fixed cutter assembly. In this closed position, the film may be pinched and held between the two clamping surfaces 186, 188.

A pick-up flange 180 is mounted on the pick-up member 178. It comprises four segments spaced apart along the length of the pick-up member 178, providing three openings 181 between adjacent segments of the flange 180. The openings 181, shown in FIG. 6C, allow the clamping surfaces 186, 188 to pinch and hold the film while the pick-up member 178 is also holding the film. When the pick-up member 178 is retracted, the clamping surfaces 186, 188 continue to hold the film.

The fixed cutter assembly 166 includes a film-cutting blade 190, positioned to engage and cut the film when the film is clamped between the two clamping surfaces 186, 188. The blade is affixed to a chain 192 which is mounted on driven sprockets 194 at the transverse ends of the fixed cutter assembly, such that by actuation of the chain the blade is moved across the full width of the film and thereby cuts the film.

The film cutter is operated in the following manner. The film-deploying machine 200 is stopped and the discharge of anchoring material is also stopped. The pick-up arms 174 are hydraulically actuated by the operator, pivoting the transverse pick-up member 178 with the pick-up flange 180 rearwardly such that they engage the film, which is hanging downwardly from the film roll 96, and brings it to the clamping surface 186 of the fixed cutter assembly. The clamping arms 182 are then actuated to pivot the transverse clamping member 184 such that the clamping surface 188 of the clamping member 184 is pressed against the clamping surface 186 of the fixed cutter assembly, with the film gripped between these two clamping surfaces. The cutting blade chain drive 192 is actuated, moving the blade transversely across the film and cutting it. The pick-up arms 174 are then actuated to retract the pick-up member 178 to its forward position. The machine 200 is moved into position to lay a new strip of film. The discharge of anchoring material is re-started and the material falls onto the film between the film roll and the fixed cutter assembly 166, holding the film in place on the ground. The clamping arms 182 are actuated to return the clamping member 184 to its open position, releasing the free end of the film. The machine is then driven forward to lay the next strip of film.

As will be apparent to those skilled in the art in the light of the foregoing disclosure, many alterations and modifications are possible in the practice of this invention without departing from the scope thereof. Possible alterations and modifications include, without limitation: (a) instead of being self-propelled, the machine may be propelled by means of towing by a compactor, loader or other vehicle; (b) the conveyors in the anchoring material distributor module may be augers or other structures, rather than belts; (c) instead of a chain floor in the box, the means for moving anchoring material to the back of the box may be any other practical material-moving means such as conveyor belts or augers; (d) a second holder for suspending a roll of film may be provided at the front end of the machine; film unwound from this roll would be run over by the tracks of the vehicle as it moves forward; and (e) instead of a film, the sheet material deployed may be any sheet material that is suitable for a particular application, for example textiles, sheathing materials, textiles, woven and unwoven fabrics, etc. Accordingly, the scope of the invention is to be construed in accordance with the following claims.

The invention claimed is:

1. A machine for laying a film on a ground surface and depositing an anchoring material on the film, comprising:
   (a) a container for holding the anchoring material;
   (b) means for releasing the anchoring material from the container;
   (c) means for moving the machine over the ground surface;
   (d) a pair of support arms each having a respective film roll support mechanism operatively connected thereto, the support arms being movable between an operating position in which the respective film roll support mechanism is extended outward from the machine at a respective side thereof, and a retracted, non-operating position in which the respective film roll support mechanism is adjacent to the respective side of the machine;
   (e) the two film roll support mechanisms each comprising:
      (i) an inflexible, movable arm and means for restraining the inflexible, movable arm from forward or rearward movement relative to a direction of travel of the machine;
      (ii) a film roll support bracket attached to the inflexible, movable arm; and
      (iii) a hydraulic system controllable by an operator of the machine for retracting and extending the inflexible, movable arm to fix the film roll support bracket in a selected position above the ground surface; and
   (f) means for holding the roll of film between the two roll support brackets for unwinding of the film onto the ground surface as the machine is moved and the anchoring material is deposited onto the film.

2. The machine according to claim 1, wherein the hydraulic system comprises a hydraulic cylinder within which the moveable arm is moveable between a retracted position and an extended position, and a hydraulic control system for operator control of the movement of the moveable arm.

3. The machine according to claim 1, wherein the two support arms are pivotable between the operating position and the retracted, non-operating position.

4. The machine according to claim 1, further comprising means for detaching each film roll support bracket from the respective movable arm, and means for moving the detached film roll support brackets and the roll of sheet material between the movable arms and the ground surface.

5. The machine according to claim 1, further comprising pivoting arm brackets for supporting the respective support arm.

6. The machine according to claim 1, wherein the means for holding the roll of film comprises a mandrel tube.

7. The machine according to claim 1 further comprising the film, wherein the film comprises a degradable polyolefin.

8. The machine according to claim 1, further comprising a film cutter assembly which comprises:
   (a) a first film-clamping surface;
   (b) means for engaging the film unwound from a roll of film carried by the machine, and bringing the film into engagement with the first film-clamping surface;
   (c) a film-clamping member having a second film-clamping surface, the film-clamping member being moveable between a first position in which the second film-clamping surface is spaced from the first film-clamping surface, and a second position in which the second film-clamping surface engages the first film-clamping surface;
   (d) means for moving the film-clamping member between its first and second positions; and
   (e) means for cutting the film when held between the first film-clamping surface and the second film-clamping surface.

9. The machine according to claim 8, wherein the means for engaging the film comprises a film pick-up assembly attached to support members extending outward from the machine.

10. The machine according to claim 9, wherein the film pick-up assembly comprises a film pick-up member supported by pivotable pick-up arms.

11. The machine according to claim 8, wherein the means for cutting the film comprises a moveable blade.

12. The machine according to claim 8, wherein the means for engaging the film comprises a film pick-up member moveable between a first position in which the film pick-up member is out of engagement with the film and a second position in which the film pick-up member engages the film and holds it adjacent to the first film-clamping surface.

13. A machine for laying a film on a ground surface and depositing an anchoring material on the film, comprising:
   (a) a container for holding and releasing the anchoring material;
   (b) a pair of support arms each having a respective film roll support mechanism operatively connected thereto, the support arms being movable between an operating position in which the respective film roll support mechanism is extended outward from the machine at a respective side thereof, and a retracted, non-operating position in which the respective film roll support mechanism is adjacent to the respective side of the machine;
   (c) the two film roll support mechanisms each comprising:
      (i) an inflexible, movable arm and means for restraining the inflexible, movable arm from forward or rearward movement relative to a direction of travel of the machine; and
      (ii) a film roll support bracket operatively connected to the movable arm, the inflexible, movable arm being retractable and extendable by a hydraulic system controllable by an operator of the machine to fix the film roll support bracket in a selected position above the ground surface; and
   (d) a film roll holder for holding the roll of film between the two roll support brackets for unwinding of the film onto the ground surface as the machine is moved over the ground surface and the anchoring material is deposited onto the film.

14. The machine according to claim 13, wherein the hydraulic system comprises a hydraulic cylinder within which the moveable arm is moveable between a retracted position and an extended position, and a hydraulic control system for operator control of the movement of the moveable arm.

15. The machine according to claim 13, wherein the two support arms are pivotable between the operating position and the retracted, non-operating position.

16. The machine according to claim 13, further comprising a winch mechanism for moving the film roll and the film roll support brackets, when detached from the movable arms, between the movable arms and the ground surface.

17. A machine for laying a film on a ground surface and depositing an anchoring material on the film, comprising:
(a) a container for holding the anchoring material;
(b) means for releasing the anchoring material from the container;
(c) means for moving the machine over the ground surface;
(d) a pair of support arms each having a respective film roll support mechanism operatively connected thereto;
(e) the two film roll support mechanisms each comprising:
(i) an inflexible, movable arm and means for restraining the inflexible, movable arm from forward or rearward movement relative to a direction of travel of the machine;
(ii) a film roll support bracket attached to the inflexible, movable arm; and
(iii) a hydraulic system controllable by an operator of the machine for retracting and extending the inflexible, movable arm to fix the film roll support bracket in a selected position above the ground surface; and
(f) means for holding the roll of film between the two roll support brackets for unwinding of the film onto the ground surface as the machine is moved and the anchoring material is deposited onto the film.

18. The machine according to claim 17, wherein the hydraulic system comprises a hydraulic cylinder within which the inflexible, moveable arm is moveable between a retracted position and an extended position, and a hydraulic control system for operator control of the movement of the moveable arm.

19. A machine for laying a film on a ground surface and depositing an anchoring material on the film, comprising:
(a) a container for holding and releasing the anchoring material;
(b) a pair of support arms each having a respective film roll support mechanism operatively connected thereto;
(c) the two film roll support mechanisms each comprising:
(i) an inflexible, movable arm and means for restraining the inflexible, movable arm from forward or rearward movement relative to a direction of travel of the machine; and
(ii) a film roll support bracket operatively connected to the inflexible, movable arm, the inflexible movable arm being retractable and extendable by a hydraulic system controllable by an operator of the machine to fix the film roll support bracket in a selected position above the ground surface; and
(d) a film roll holder for holding the roll of film between the two roll support brackets for unwinding of the film onto the ground surface as the machine is moved over the ground surface and the anchoring material is deposited onto the film.

20. The machine according to claim 19, wherein the hydraulic system comprises a hydraulic cylinder within which the moveable arm is moveable between a retracted position and an extended position, and a hydraulic control system for operator control of the movement of the moveable arm.

\* \* \* \* \*